United States Patent
Kershaw

(10) Patent No.: US 7,668,897 B2
(45) Date of Patent: Feb. 23, 2010

(54) RESULT PARTITIONING WITHIN SIMD DATA PROCESSING SYSTEMS

(75) Inventor: Daniel Kershaw, Austin, TX (US)

(73) Assignee: ARM Limited, Cambridge (GB)

( * ) Notice: Subject to any disclaimer, the term of this patent is extended or adjusted under 35 U.S.C. 154(b) by 1029 days.

(21) Appl. No.: 10/461,880

(22) Filed: Jun. 16, 2003

(65) Prior Publication Data

US 2004/0255100 A1 Dec. 16, 2004

(51) Int. Cl.
*G06F 7/38* (2006.01)
(52) U.S. Cl. .................. 708/513; 712/22
(58) Field of Classification Search .......... 708/513
See application file for complete search history.

(56) References Cited

U.S. PATENT DOCUMENTS

| | | |
|---|---|---|
| 5,583,804 A | 12/1996 | Seal et al. |
| 5,627,966 A | 5/1997 | Hanko |
| 5,636,351 A | 6/1997 | Lee |
| 5,675,526 A | 10/1997 | Peleg et al. |
| 5,881,259 A | 3/1999 | Glass et al. |
| 6,253,299 B1 * | 6/2001 | Smith et al. .................. 711/171 |
| 6,564,238 B1 * | 5/2003 | Kim et al. .................... 708/513 |
| 7,039,906 B1 * | 5/2006 | Trelewicz et al. ............ 717/149 |
| 2001/0034826 A1 * | 10/2001 | Roussel et al. .............. 712/225 |
| 2002/0010847 A1 * | 1/2002 | Abdallah et al. .............. 712/22 |

FOREIGN PATENT DOCUMENTS

| | | |
|---|---|---|
| EP | 1 302 848 | 4/2003 |
| JP | 8-6789 | 1/1996 |
| JP | 8-63353 | 3/1996 |
| JP | 11-500547 | 1/1999 |
| JP | 2001-501001 | 1/2001 |
| WO | WO 96/17293 | 6/1996 |

* cited by examiner

*Primary Examiner*—David H Malzahn
(74) *Attorney, Agent, or Firm*—Nixon & Vanderhye P.C.

(57) ABSTRACT

Within a processor 2 providing single instruction multiple data (SIMD) type operation, single data processing instructions can serve to control processing logic 4, 6, 8, 10 to perform SIMD-type processing operations upon multiple independent input values to generate multiple independent result values having a greater data width than the corresponding input values. A repartitioner (FIG. 5) in the form of appropriately controlled multiplexers serves to partition these result data values into high order bit portions and low order bit portions that are stored into separate registers 38, 40. The required SIMD width preserved result values can be read from the desired high order 38 result register or low order result register 40 without further processing being required. Furthermore, the preservation of the full result facilitates improvements in accuracy, such as over extended accumulate operations and the like.

33 Claims, 6 Drawing Sheets

(i)

| A0 | A1 |
|---|---|

| B0 | B1 |
|---|---|

| $A0B0_H$ | $A1B1_H$ | ~17 |
|---|---|---|

| $A0B0_L$ | $A1B1_L$ | ~18 |
|---|---|---|

(ii)

| A0 | A1 | A2 | A3 |
|---|---|---|---|

| B0 | B1 | B2 | B3 |
|---|---|---|---|

| $A0B0_H$ | $A1B1_H$ | $A2B2_H$ | $A3B3_H$ |
|---|---|---|---|

| $A0B0_L$ | $A1B1_L$ | $A2B2_L$ | $A3B3_L$ |
|---|---|---|---|

(iii)

| A0 | A1 | A2 | A3 | A4 | A5 | A6 | A7 |
|---|---|---|---|---|---|---|---|

| B0 | B1 | B2 | B3 | B4 | B5 | B6 | B7 |
|---|---|---|---|---|---|---|---|

| $A0B0_H$ | $A1B1_H$ | $A2B2_H$ | $A3B3_H$ | $A4B4_H$ | $A5B5_H$ | $A6B6_H$ | $A7B7_H$ |
|---|---|---|---|---|---|---|---|

| $A0B0_L$ | $A1B1_L$ | $A2B2_L$ | $A3B3_L$ | $A4B4_L$ | $A5B5_L$ | $A6B6_L$ | $A7B7_L$ |
|---|---|---|---|---|---|---|---|

FIG. 3

RESULT PARTITIONING WITHIN SIMD DATA PROCESSING SYSTEMS

BACKGROUND OF THE INVENTION

1. Field of the Invention

This invention relates to the field of data processing systems. More particularly, this invention relates to the partitioning of results containing multiple result data values within single instruction multiple data (SIMD) data processing systems.

2. Description of the Prior Art

It is known to provide data processing systems with SIMD capabilities. In such systems a register typically contains multiple independent data values to be manipulated. As an example, a 32-bit register may contain two independent 16-bit data values which are to be separately added to, multiplied with or otherwise combined with, for example, two other 16-bit data values stored within another 32-bit register. Such SIMD operations are common in the field of digital signal processing and have advantages including increased processing speed and reduced code density.

An example of known SIMD techniques are the MMX instructions of the Intel processors produced by Intel Corporation. In the MMX instructions are included instructions which multiply together two registers each containing four 16-bit data values. When a 16-bit data value is multiplied by another 16-bit data value, then the result is a 32-bit data value. Accordingly, when the four pairs of 16-bit data values specified in the MMX SIMD instruction are multiplied together, the result is four 32-bit result data values. In many circumstances it is desired to maintain the SIMD format and data size when such operations are performed. To this end, the MMX instructions include a type of instruction in which in the above circumstance the result generated is in the form of four 16-bit result data values being the 16 most significant bits of the respective 32-bit result with these 16-bit values being combined within a single 64-bit register, i.e. producing a SIMD-type result. As an alternative, it is also possible to have separate instructions which generate the four least significant 16-bits of the multiplication result as their output combined in a 64-bit register.

SUMMARY OF THE INVENTION

Viewed from one aspect the present invention provides apparatus for performing a data processing operation in response to a data processing instruction, said apparatus comprising:

processing logic being responsive to said data processing instruction to generate from a plurality of independent data values stored within one or more input stores a respective plurality of result data values; and a result partitioner responsive to said data processing instruction to store a high order bit portion of each result data value within a high order result store and a low order bit portion of each result data value within a low order result store.

The invention recognises that whilst it may be desirable in many cases to produce SIMD-type results, in some circumstances it is important that the full precision of the results is maintained so as to avoid disadvantageous consequences of such as inappropriate rounding errors and the like. Accordingly, the present technique provides a system in which in response to a single data processing instruction, thereby yielding a high code density, a SIMD-type operation is performed upon multiple independent data values with the multiple result data values being stored in a SIMD form with the high order portion in one store and the low order portion in another store. Accordingly, the SIMD-type results are immediately available without further processing if this is required and yet the full precision is maintained and can be carried forward since all of the precision of the result is maintained in the combination of the two stores and may be manipulated therefrom.

It will be appreciated that the type of data processing operation performed by the processing logic to generate the result data values from the multiple independent input data values could take a wide variety of different forms. It is possible that the input to the processing logic could be the contents of a single store with the results being the squares of the independent data values stored therein, or the square roots of those values to a certain precision according to some calculation techniques, or the like. However, in preferred embodiments of the invention the processing logic is operable to multiply together respective pairs of independent data values with the first independent data value of a pair being taken from a first input store and a second independent data value of the pair being taken from a second input store.

Such SIMD-type multiply operations are common and increase the data width of the result requiring the present technique to be utilised if full precision is to be maintained and yet SIMD-type results directly generated.

The present technique is particularly well suited to situations in which an accumulate operation is associated with the multiply since the additional precision maintained by the present technique helps avoid the cumulative effect of multiple rounding errors which can otherwise occur in an accumulate type operation.

Whilst it is appreciated that the high order bit portion and the low order bit portion could have a variety of different relationships, it is most efficient and preferred when they are non-overlapping contiguous portions of the result data value concerned.

The data processing instruction can specify a variety of different forms of multiplication operation, such as integer multiplication or signed fractional value multiplication. However, the invention is particularly well suited to situations where the multiplication specified is signed fractional multiplication and in which the processing logic is operable to double each result data value so as to take account of the presence of a signed bit on each input data value. The doubling can be effectively be included with the other operations with little additional overhead.

The data width of the independent SIMD data values can vary and in preferred embodiments the data processing instruction specifies the data width concerned.

The multiplier can take several forms depending upon the particular circumstances required, but a particularly preferred form is an integer multiplier as this is relatively simple and fast and yet able to produce a wide variety of different types of operation with appropriate configuration.

As an example of the type of processing operation that may be specified by the data processing instruction the processing may optionally be such as to perform saturated arithmetic.

The result partitioner serves to divide the result data values between different stores and in preferred embodiments a plurality of multiplexers are used to do this. The present techniques can be applied to many different types of data processing system, such as DSPs, but are particularly well suited for use in a processor core.

It will be appreciated that the input stores, the high order result store, the low order result store and the stores within the system could have a wide variety of different forms, but preferred embodiments are one or more of a register bank register, a dedicated register, a buffer memory, a first-in-first-out buffer or a portion of a memory (e.g. cache, main, bulk etc.). These different types of store can be used in mixed situations where different stores have different forms. In the case of the use of memory or buffers rather than registers for the stores, streaming of a sequence of data values to be manipulated may conveniently be provided.

As a way of increasing the range of the results being calculated in a way that is readily compatible with this technique, preferred embodiments also generate one or more high order guard bits, such as may be used in the context of saturated arithmetic. These guard bits can be provided with their own stores to which the result partitioning stores the guard bits.

Viewed from another aspect the present invention provides a method of performing a data processing operation in response to a data processing instruction, said method comprising the steps of:

in response to said data processing instruction, generating from a plurality of independent data values stored within one or more input stores a respective plurality of result data values; and in response to said data processing instruction partitioning said result data values by storing a high order bit portion of each result data value within a high order result store and a low order bit portion of each result data value within a low order result store.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates the relationship between input data values and output data values in accordance with the present techniques for various data widths;

DESCRIPTION OF THE PREFERRED EMBODIMENTS

Figure 1:
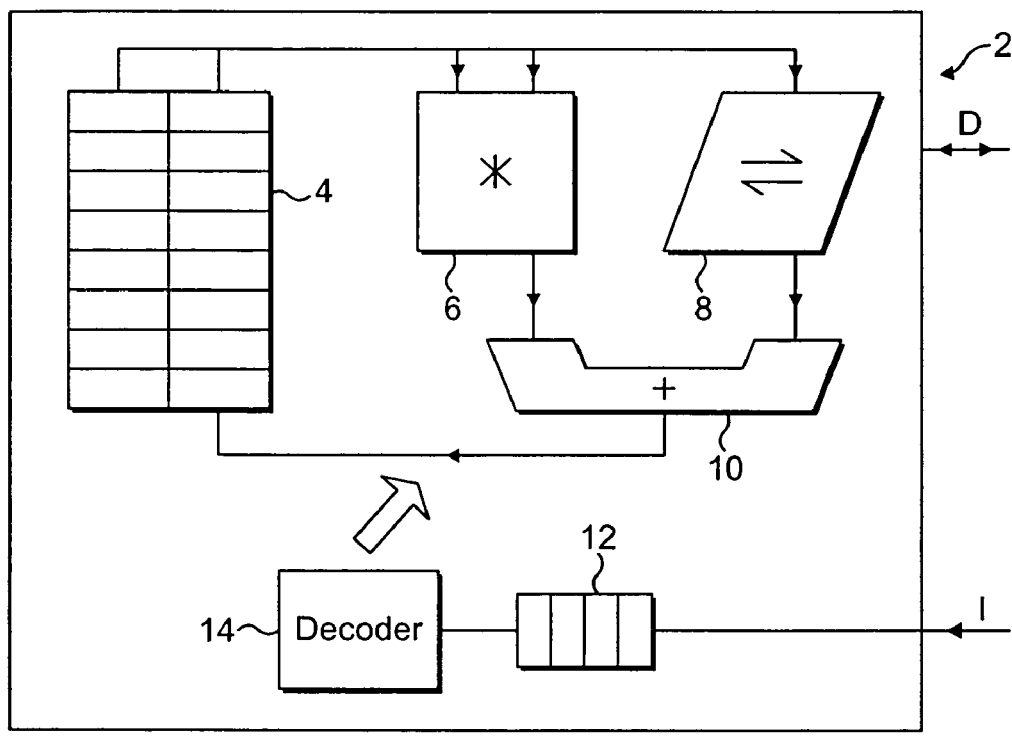
FIG. 1 schematically illustrates a processor core of the type which may utilise the present technique.

FIG. 1 illustrates a processor core 2 such as those produced by ARM Limited of Cambridge, England. The processor core 2 includes a register bank 4, a multiplier 6, a shifter 8, and an adder 10 forming part of the data processing data path. Data processing instructions are received into an instruction pipeline 12 from where they are decoded by an instruction decoder 14 to generate control signals which control the operation of the other circuit elements within the processor 2. It will be appreciated that the processor 2 will typically include many further circuit elements, but these are not illustrated for the sake of simplicity. In the example of FIG. 1, input data values are read from registers within the register bank 4 and result with data values written back into registers of the register bank 4. In other embodiments the input values and the result values may be read from and written to different types of store such as dedicated registers, buffer memories, first-in-first-out buffers and general purpose memories. These may be used as alternatives and in various mixed combinations. These different alternatives are not illustrated in FIG. 1.

Figure 2:
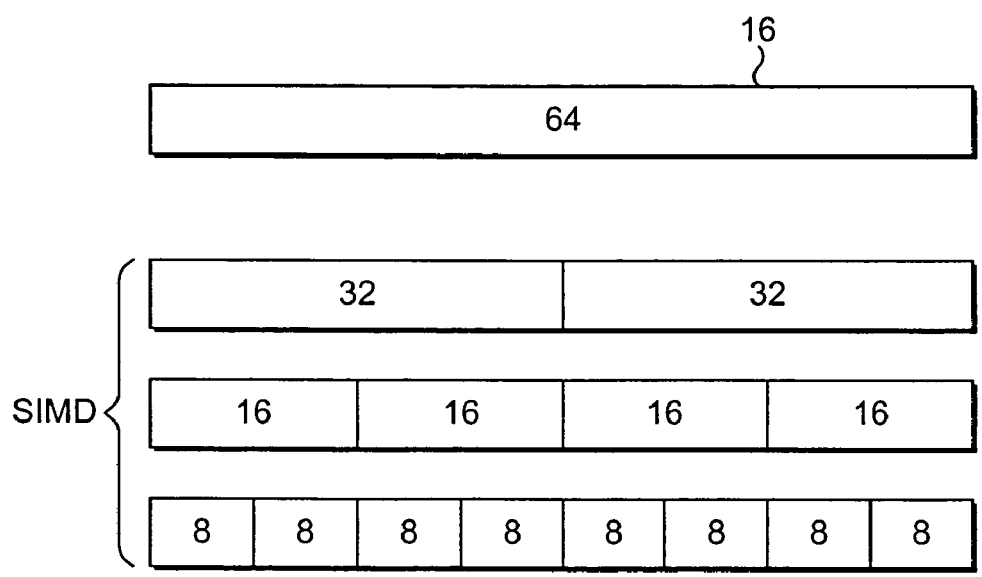
FIG. 2 schematically illustrates various SIMD data formats.

FIG. 2 illustrates various different SIMD data formats. The data width of the data path illustrated in FIG. 1 may be 64-bits in a version of an ARM processor modified to support such a data width. This data path may manipulate a full length 64-bit word 16 in a non-SIMD mode. In this example the various SIMD modes manipulate either two 32-bit data values, four 16-bit data values or eight 8-bit data values. In the SIMD mode the data values are independent of one another and the data path within the processor 2 of FIG. 1 is configured according to the size of the SIMD data values to process these data values separately, e.g. by breaking carry chains at the appropriate point and the like. The adaption of data paths to perform SIMD type operations is in itself known and will not be described further herein.

FIG. 3 illustrates the relationship between input data values and result data values in different SIMD data width modes in accordance with the present techniques. In the example (i), the input data values comprise two 32-bit input values, A0, A1, stored within a first 64-bit register and two 32-bit input values B0, B1 stored in a second register. In this example, the data processing operation specified by the processing instruction is a SIMD multiply and accordingly the 32-bit value A0 is multiplied by the 32-bit value B0 and the 32-bit value A1 is multiplied by the 32-but value B1. Both of these multiplications produce 64-bit results being A0 B0 and A1 B1 respectively. The most significant 32 bits of these two results are written into a high order result register 17. The least significant 32 bits of these two results are written into a low order result register 18. The two portions written in the different registers 17, 18 are non-overlapping and contiguous.

The examples of (ii) and (iii) are analogous and respectively relate to 16-bit input values and 8-bit input values being subject to multiplications by a SIMD multiplication instruction and generating respective result data values in different registers being either the higher order half of the total result or the lower order half of the total result.

If it is desired to continue further processing using the results generated by the multiply in a further SIMD type operation of the same data width, then the higher order result register 17 may be read directly and used as an input for such a further operation. No shifting or re-arrangement is needed improving code density, speed, power consumption etc. A particularly preferred circumstance is where the high order result register 17 and the low order result register 18 are being used as the destination for an accumulate operation whereby the result of successive multiplications may be accumulated into these registers and the low order result values preserved in the low order result register 18 being successively updated so as to produce more accurate results and avoid rounding errors. Thus, the present technique allows direct access to the correct data width values using a single instruction and yet preserves accuracy due to the maintenance of the full data width of the results.

Figure 4:
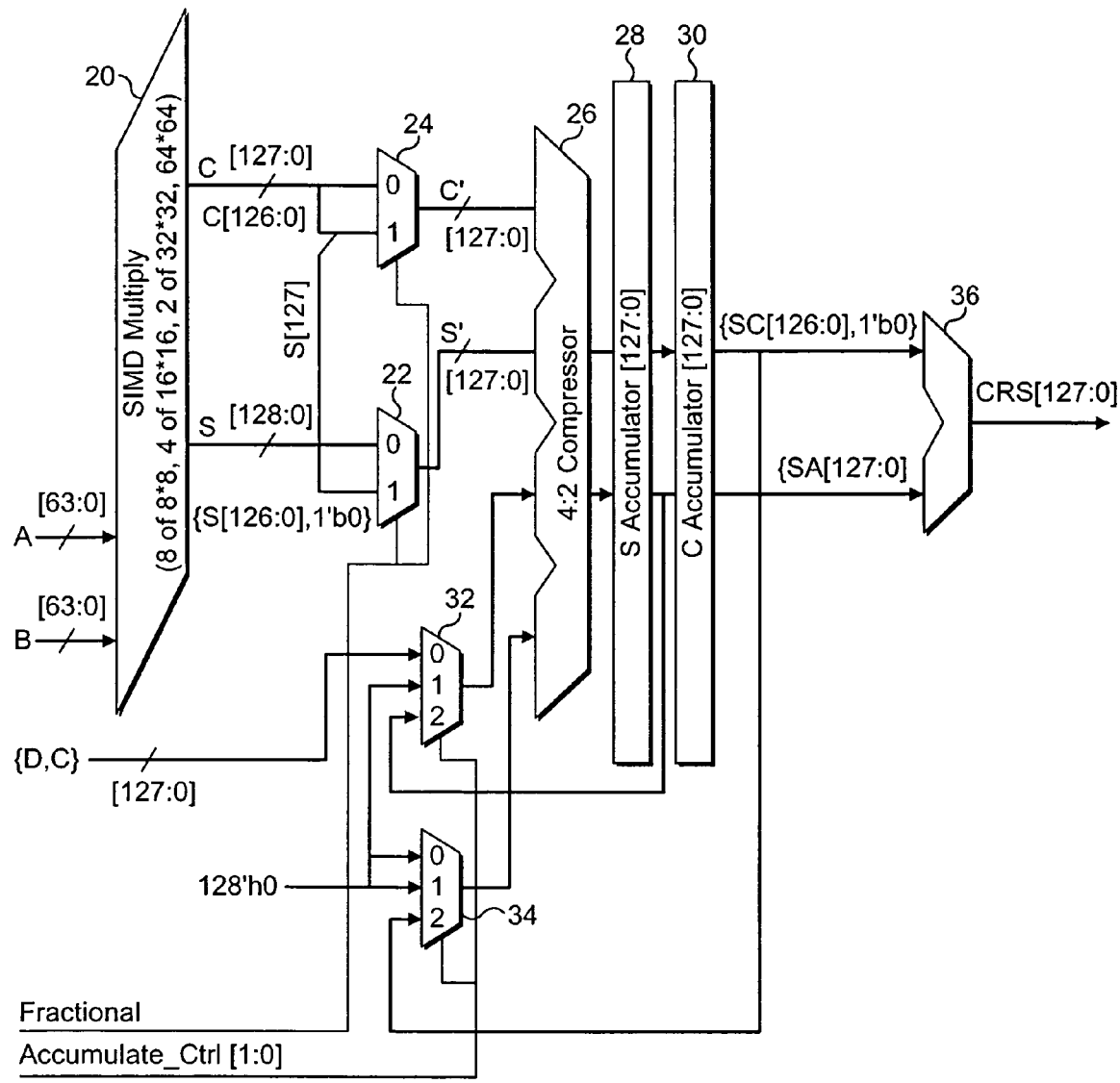
FIG. 4 schematically illustrates part of the data processing path within the processor core of FIG. 1.

FIG. 4 schematically illustrates a portion of the data path of FIG. 1 in more detail. A SIMD integer multiplier 20 is supplied with two 64-bit input values taken from respective registers of the register bank 4. These input values may represent a single 64-bit times 64-bit non-SIMD operation or one of the three SIMD type of operations previously discussed. The SIMD multiplier 20 includes the appropriate breaks in the carry chain and the like to properly segment the independent input values and resulting output values. The output from the SIMD multiplier 20 is in a carry-save format. When the system is operating in a signed fractional mode a fractional mode indicating signal supplied to the multiplexers 22, 24 serves to shift the carry save output by one bit position which is equivalent to doubling the value in a way that compensates for the extra sign bit at the most significant position. An adder 26 serves to add the carry-save output from the SIMD multiplier 20 with either a recirculated partially accumulated value from the save and carry registers 28, 30 or with a 128-bit value from registers D, C of the register bank 4 as selected by the multiplexers 32, 34. The multiplexers 32, 34 are controlled by an accumulate control signal the various values of which are illustrates in the table at the bottom of FIG. 4. The system can be arranged to accumulate from a source register file, multiply without an accumulate or accumulate to a previously partially calculated result, such as during a vector type operation, bypassing the register bank as a source for the accumulate values.

When the multiplication and addition operations for a given processing operation have completed, then the final 128-bit save and carry values from the registers 28, 30 are passed to an adder 36 where they are added together to form a conventional 128-bit representation of the result. The multiplication and addition may be pipelined operations. It will be appreciated that the output of the adder 36 has double the bit width compared to the 64-bit input values from registers A, B. Thus, the SIMD result values have twice the width of the independent SIMD input values. The output of the adder 36 is supplied to a result partitioner which has in this example embodiment the form of the various multiplexers illustrated in FIG. 5.

Figure 5:
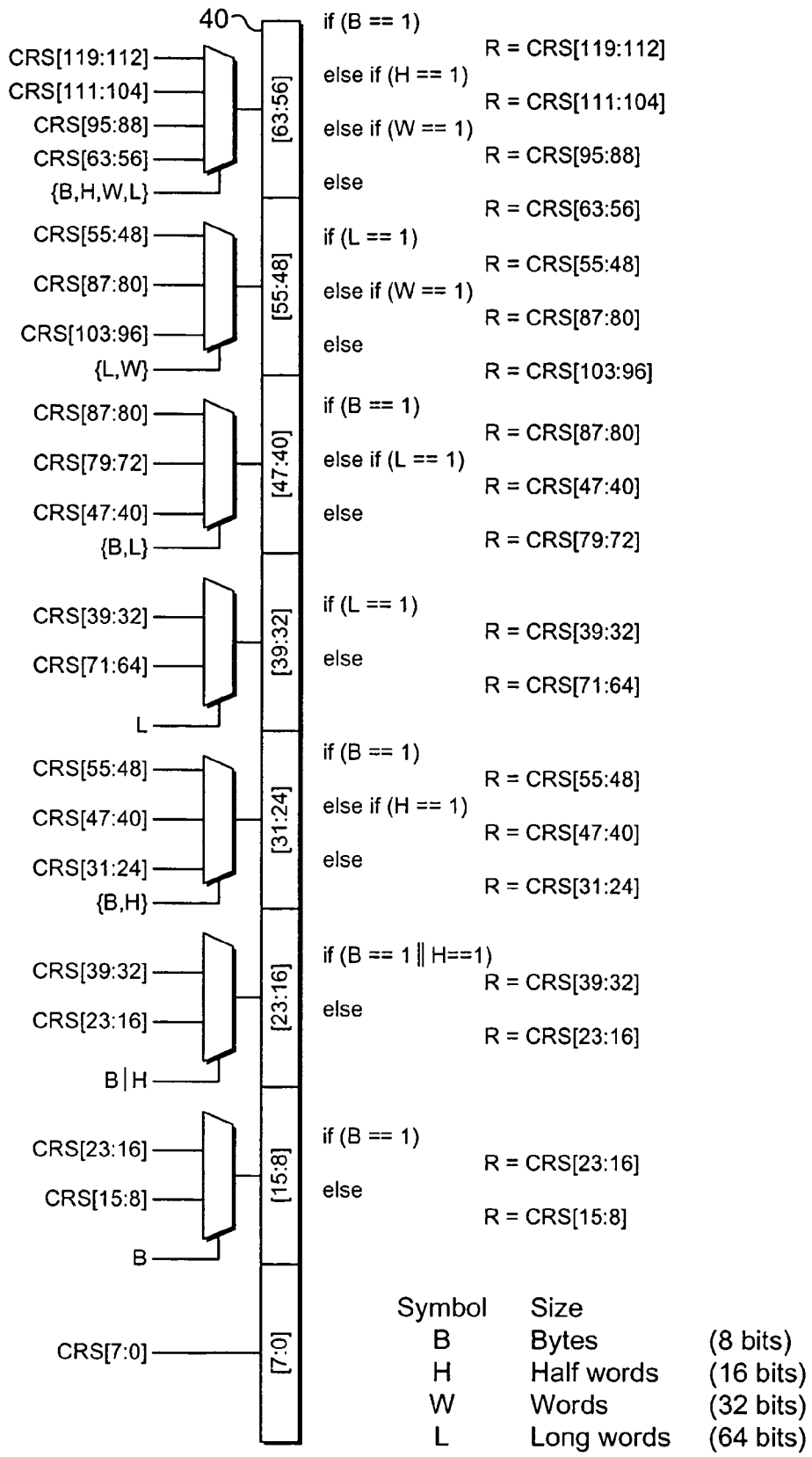
FIG. 5 illustrates a multiplexing arrangement for partitioning the result data values in accordance with the present techniques.
Figure 5:
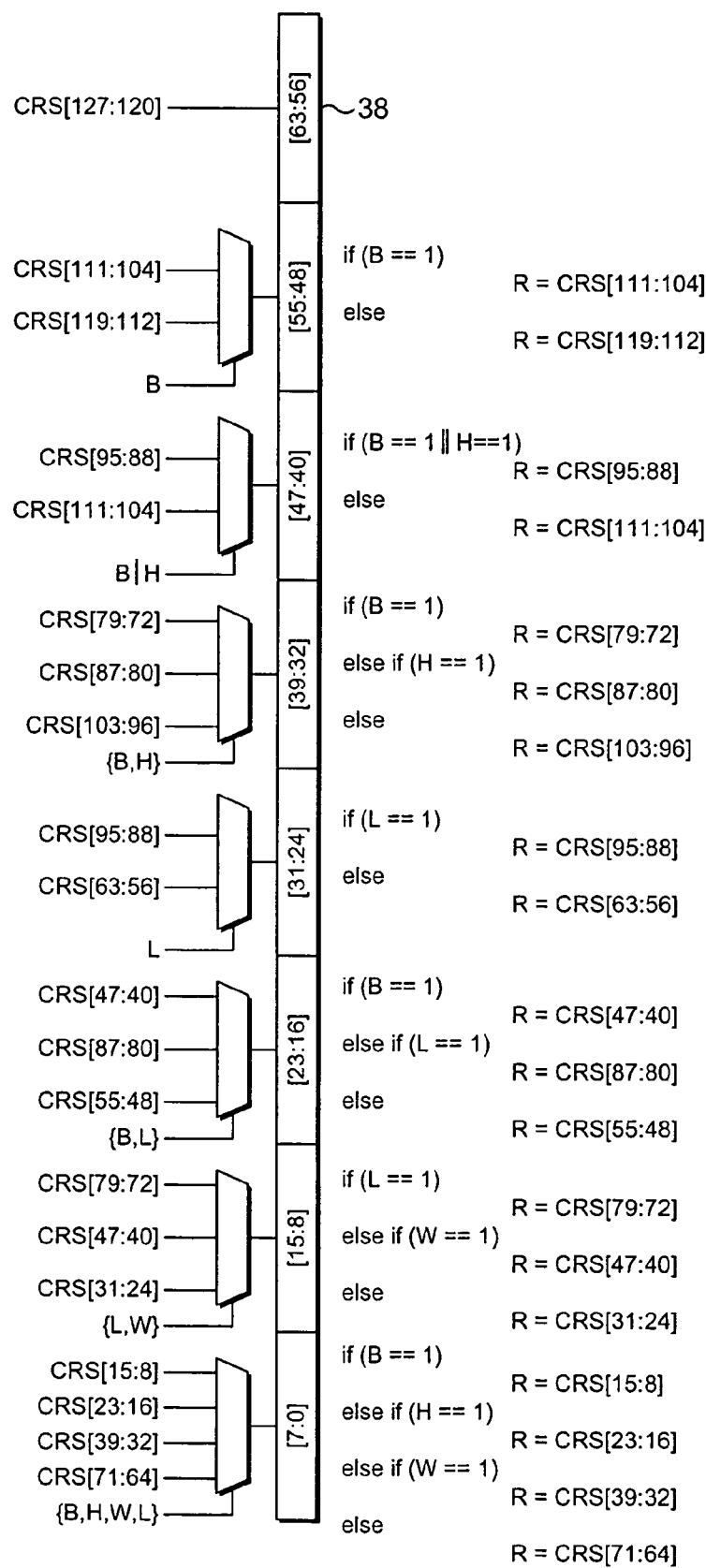

In FIG. 5 the high order result register 38 receives selected portions of each result value being the high order portions thereof. The low order result register 40 receives the corresponding low order portion of the result values. Control signals B, H, W and L represent the SIMD data width (byte, halfword, word or long) which is in use. One of these values is asserted "1" at any one time with the others being "0". These width specifying signals control the multiplexers illustrated in FIG. 5 in accordance with the logical expressions given adjacent each multiplexer so as to select between the various inputs of the multiplexers concerned. The overall action of the multiplexers of FIG. 5 controlled by their control signals is to select/repartition from amongst the 128 bits output by the adder 36 to form the contents of the high order result register 38 and the low order result register 40 as illustrated in the different examples of FIG. 3.

The program instructions which are supplied to the decoder 14 of FIG. 1 to control the circuits of FIGS. 4 and 5 in the manner shown have a syntax including parameters specifying the data width in use, whether that be a non-SIMD full data width or one of the various SIMD data width. The program instructions also specify whether an accumulate is being performed and whether this is done using external register values or an "internal" partial result.

In addition to the two result registers 38, 40 of FIG. 5, a guard register may also be provided. Into this guard register are supplied guard bits calculated from extended versions of the accumulated results. As an example, if 16-bit SIMD data values were being used in a multiply accumulate operation, the accumulators would be greater than 32 bits, e.g. 34 or 36 bits depending upon whether two or four guard bits are provided, such that overflow from the accumulated values would be accommodated within the guard bits. In such embodiments, the guard bits could be partitioned out into a separate guard bit register and in this form the guard bit register can be considered to provide guard bits at the most significant end of the results with the low order result register providing guard bits at the lower end of the result values and the high order result register providing the SIMD width preserved data value normally required.

Figure 6:
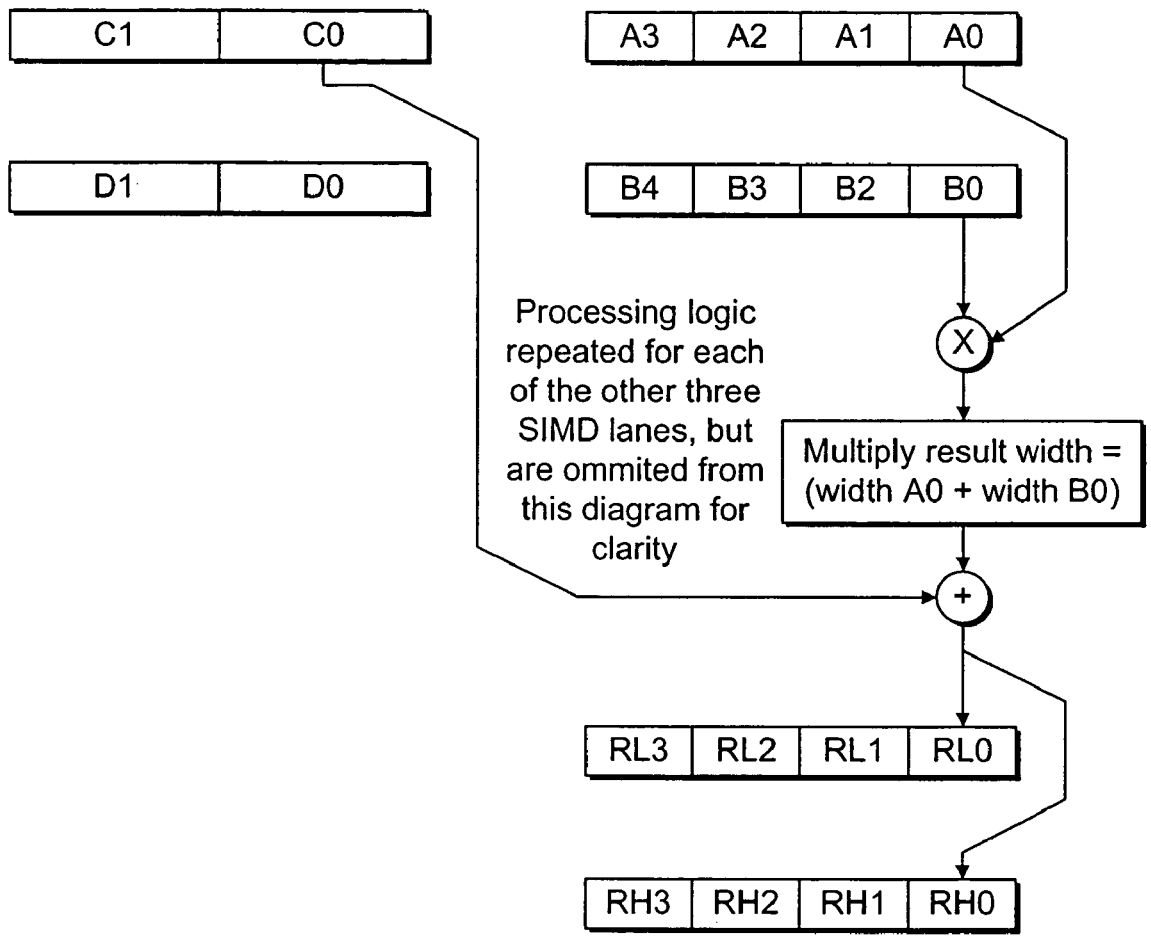
FIG. 6 schematically illustrates another form of multiply accumulate operation in accordance with the present technique.

FIG. 6 schematically illustrates a multiple accumulate operation with multiple data formats, giving a stacked register result.

Registers A and B are 64 bit SIMD registers holding, in this case, 4 16-bit quantities (A0-A3 and B0-B3). The result of multiplying these registers together is a vector of 4 results, each of which may be up to 32 bits wide.

It is possible to accumulate the 4 32 bit multiplication results with four 32 bit values held in another two registers (c and D) which each hold 2 32 bit quantities.

The result of the addition could then be stored in registers RL and RH in a stacked format.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for performing a single instruction multiple data (SIMD) data processing operation in response to a single data processing instruction, said apparatus comprising:
    processing logic, responsive to said single data processing instruction, for generating from a plurality of independent data values stored within one or more input stores, a respective plurality of result data values; and
    a result partitioner, responsive to said data processing instruction, for storing together within a higher order result store a high order bit portion of each result data value of said respective plurality of result data values and for storing together within a lower order result store a low order bit portion of each result data value of said respective plurality of result data values.

2. Apparatus as claimed in claim 1, wherein said processing logic is operable to multiply together respective pairs of independent data values, a first independent data value of a pair being taken from a first input store and a second independent data value of said pair being taken from a second input store.

3. Apparatus as claimed as claim 2, wherein processing logic is operable to accumulate values already stored within said high order result store and said low order result store with values generated from said respective pairs of independent data values to generate said plurality of result data values.

4. Apparatus as claimed in claim 2, wherein when said data processing instruction indicates that said independent data values are signed fractional values, said processing logic is operable to double each value obtained by multiplying a first independent data value with a second independent data value.

5. Apparatus as claimed in claim 2, wherein said processing logic includes an integer multiplier operable to multiply together said respective pairs of independent data values.

6. Apparatus as claimed in claim 1, wherein said high order bit portion and said low order bit portion of each result data value are non-overlapping contiguous portions of said result data value.

7. Apparatus as claimed in claim 1, wherein each input store stores M independent N-bit data values.

8. Apparatus as claimed in claim 7, wherein said data processing instruction specifies a datawidth of said independent data values.

9. Apparatus as claimed in claim 1, wherein said processing logic is operable to perform saturated data processing operations upon said independent data values.

10. Apparatus for performing a data processing operation in response to a data processing instruction, said apparatus comprising:
processing logic means, responsive to said data processing instruction, for generating from a plurality of independent data values stored within one or more input stores, a respective plurality of result data values; and
a result partitioner means, responsive to said data processing instruction, for storing a high order bit portion of each result data value within a high order result store and a low order bit portion of each result data value within a low order result store, wherein said result partitioner includes a plurality of multiplexers controlled in dependence upon said data processing instruction.

11. Apparatus as claimed in claim 1, wherein said apparatus is a processor core.

12. Apparatus as claimed in claim 1, wherein said one or more input stores are one or more of:
a register bank register;
a dedicated register;
a buffer memory;
a first in first out buffer; and
a memory.

13. Apparatus as claimed in claim 1, wherein said high order result store is one of:
a register bank register;
a dedicated register;
a buffer memory;
a first in first out buffer; and
a memory.

14. Apparatus as claimed in claim 1, wherein said low order result store is one of:
a register bank register;
a dedicated register;
a buffer memory;
a first in first out buffer; and
a memory.

15. Apparatus as claimed in claim 1, wherein said processing logic is operable to generate one or more high order guard bits for each result data value and said result partitioner is operable to store said guard bits within a guard bit store.

16. Apparatus as claimed in claim 15, wherein said guard bit store is one of:
a register bank register;
a dedicated register;
a buffer memory;
a first in first out buffer; and
a memory.

17. A method of performing a single instruction multiple data (SIMD) data processing operation in response to a single data processing instruction, said method comprising the steps of:
in response to said single data processing instruction, generating from a plurality of independent data values stored within one or more input stores a respective plurality of result data values; and
in response to said data processing instruction, partitioning said result data values by storing together within a high order result store a high order bit portion of each result data value of said respective plurality of result data values and for storing together within a low order result store a low order bit portion of each result data value of said respective plurality of result data values.

18. A method as claimed in claim 17, wherein said step of generating multiplies together respective pairs of independent data values, a first independent data value of a pair being taken from a first input store and a second independent data value of said pair being taken from a second input store.

19. A method as claimed as claim 18, comprising accumulating values already stored within said high order result store and said low order result store with values generated from said respective pairs of independent data values to generate said plurality of result data values.

20. A method as claimed in claim 18, wherein when said data processing instruction indicates that said independent data values are signed fractional values, doubling each value obtained by multiplying a first independent data value with a second independent data value.

21. A method as claimed in claim 18, wherein said step of generating multiplies together said respective pairs of independent data values with an integer multiplier.

22. A method as claimed in claim 17, wherein said high order bit portion and said low order bit portion of each result data value are non-overlapping contiguous portions of said result data value.

23. A method as claimed in claim 17, wherein each input store stores M independent N-bit data values.

24. A method as claimed in claim 23, wherein said data processing instruction specifies a datawidth of said independent data values.

25. A method as claimed in claim 17, wherein said steps of generating and partitioning perform saturated data processing operations upon said independent data values.

26. A method of performing a data processing operation in response to a data processing instruction, said method comprising the steps of:
in response to said data processing instruction, generating from a plurality of independent data values stored within one or more input stores a respective plurality of result data values; and
in response to said data processing instruction partitioning said result data values by storing a high order bit portion of each result data value within a high order result store and a low order bit portion of each result data value within a low order result store, wherein partitioning is at least partially performed by a plurality of multiplexers controlled in dependence upon said data processing instruction.

27. A method as claimed in claim 17, wherein said method is performed within a processor core.

28. A method as claimed in claim 17, wherein said one or more input stores are one or more of:
a register bank register;
a dedicated register;
a buffer memory;
a first in first out buffer; and
a memory.

29. A method as claimed in claim 17, wherein said high order result store is one of:
a register bank register;
a dedicated register;
a buffer memory;
a first in first out buffer; and
a memory.

30. A method as claimed in claim 17, wherein said low order result store is one of:
a register bank register;
a dedicated register;
a buffer memory;
a first in first out buffer; and
a memory.

31. A method as claimed in claim 17, wherein said step of generating generates one or more high order guard bits for each result data value and said step of partitioning stores said guard bits within a guard bit store.

32. A method as claimed in claim 31, wherein said guard bit store is one of:
- a register bank register;
- a dedicated register;
- a buffer memory;
- a first in first out buffer; and
- a memory.

33. Apparatus for performing a data processing operation in response to a data processing instruction, said apparatus comprising:

processing logic being responsive to said data processing instruction to generate from a plurality of independent data values stored within one or more input stores a respective plurality of result data values; and a result partitioner responsive to said data processing instruction to store a high order bit portion of each result data value within a high order result store and a low order bit portion of each result data value within a low order result store, wherein said result partitioner includes a plurality of multiplexers controlled in dependence upon said data processing instruction.

\* \* \* \* \*